(12) United States Patent
Kobayashi

(10) Patent No.: US 11,377,050 B2
(45) Date of Patent: *Jul. 5, 2022

(54) COMBINATION CABLE FOR VEHICLE

(71) Applicant: SUMITOMO WIRING SYSTEMS, LTD., Mie (JP)

(72) Inventor: Kenta Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,881

(22) Filed: Jul. 2, 2021

(65) Prior Publication Data

US 2021/0331634 A1 Oct. 28, 2021

Related U.S. Application Data

(63) Continuation of application No. 16/909,474, filed on Jun. 23, 2020, now Pat. No. 11,077,807, which is a
(Continued)

(30) Foreign Application Priority Data

Oct. 14, 2015 (JP) .................................. 2015-203082

(51) Int. Cl.
*H01B 11/02* (2006.01)
*B60R 16/02* (2006.01)
(Continued)

(52) U.S. Cl.
CPC .......... *B60R 16/0215* (2013.01); *B60R 16/03* (2013.01); *H01B 7/17* (2013.01); *H01B 9/02* (2013.01); *H01B 11/04* (2013.01)

(58) Field of Classification Search
CPC ............ H01B 7/04; H01B 11/02; H01B 11/04
See application file for complete search history.

(56) References Cited

U.S. PATENT DOCUMENTS 6,448,500 B1   9/2002   Hosaka et al.
6,844,500 B2   1/2005   Williams et al.
(Continued)

FOREIGN PATENT DOCUMENTS

JP   2014-241286 A   12/2014
WO   95/04360 A1    2/1995

OTHER PUBLICATIONS

Official Communication issued in International Bureau of WIPO Patent Application No. PCT/JP2016/079566, dated Oct. 25, 2016.
(Continued)

*Primary Examiner* — Chau N Nguyen
(74) *Attorney, Agent, or Firm* — Greenblum & Bernstein, P.L.C.

(57) ABSTRACT

Provided is a combination cable for a vehicle that is capable of reducing noise interference and cross-talk between twisted pair wires. The combination cable for a vehicle includes a wire bundle and a sheath covering the wire bundle. The wire bundle includes a two-core first twisted pair wire, a two-core second twisted pair wire, a one-core first wire, and a one-core second wire. When viewed in cable cross-section, the wire bundle has the first twisted pair wire disposed on one side of a center line that runs from a center of the first wire to a center of the second wire, and has the second twisted pair wire disposed on the other side of the center line, and the first twisted pair wire and the second twisted pair wire are separated from each other.

6 Claims, 3 Drawing Sheets

Related U.S. Application Data continuation of application No. 15/764,148, filed as application No. PCT/JP2016/079566 on Oct. 5, 2016, now Pat. No. 10,723,289.

(51) Int. Cl.
  *H01B 11/04* (2006.01)
  *B60R 16/03* (2006.01)
  *H01B 7/17* (2006.01)
  *H01B 9/02* (2006.01)

(56) References Cited

U.S. PATENT DOCUMENTS

| | | |
|---|---|---|
| 9,508,467 B2 | 11/2016 | Pon et al. |
| 9,881,716 B2 | 1/2018 | Hayakawa et al. |
| 10,723,289 B2 | 7/2020 | Kobayashi |
| 11,077,807 B2 * | 8/2021 | Kobayashi .............. B60R 16/03 |
| 2007/0163800 A1 | 7/2007 | Clark et al. |
| 2008/0183353 A1 | 7/2008 | Post et al. |
| 2010/0072931 A1 | 3/2010 | Bodner et al. |
| 2012/0292079 A1 | 11/2012 | Muramatsu et al. |
| 2013/0277087 A1 | 10/2013 | Hayakawa et al. |
| 2014/0190741 A1 | 7/2014 | Hayakawa |
| 2015/0083482 A1 | 3/2015 | Eshima et al. |
| 2016/0176369 A1 | 6/2016 | Ito et al. |

OTHER PUBLICATIONS

German Office Action issued in German Patent Application No. 11 2016 004 742.8, dated Apr. 12, 2022, together with English translation thereof.

\* cited by examiner

COMBINATION CABLE FOR VEHICLE

CROSS REFERENCE TO RELATED APPLICATIONS

This application is a Continuation of U.S. patent application Ser. No. 16/909,474, filed on Jun. 23, 2020, which is a Continuation of U.S. patent application Ser. No. 15/764,148, filed on Mar. 28, 2018, which is a U.S. National Stage Application of International Patent Application No. PCT/JP2016/079566, filed on Oct. 5, 2016, and which claims priority to Japanese Patent Application No. 2015-203082, filed on Oct. 14, 2015. The entire disclosures of each of the above-identified applications, including the specification, drawings, and claims of each of these applications, are incorporated by reference herein in their entirety.

FIELD

The present application relates to a combination cable for a vehicle.

BACKGROUND

Conventionally, in the automotive field, a combination cable is known that has a multi-core structure in which a sheath covers a wire bundle configured by bundling together a plurality of wires. The wire bundle often has a structure in which various wires are twisted together into a single unit. Examples of the wires configuring the wire bundle may include a one-core wire in which an outer circumference of a conductor is covered by an insulator, a two-core twisted pair wire in which a pair of wires are twisted together, or the like.

Prior-published Patent Literature 1 discloses a combination cable for a vehicle in which a dedicated cable for an electric parking brake (connected to an electric parking brake mechanism) and an ABS sensor cable (connected to an ABS sensor) are covered by a shared exterior sheath and unified.

RELATED ART

Patent Literature

Patent Literature 1: Japanese Patent Laid-open Publication No. 2014-241286

SUMMARY

Problems to be Solved

In such a case, when two twisted pair wires are twisted together in the wire bundle, there is an issue that noise interference and cross-talk may occur between the twisted pair wires. When noise interference and cross-talk occur in a combination cable, there is a potential for a malfunction to occur.

The present application has been conceived in light of the background given above and seeks to provide a combination cable for a vehicle that is capable of reducing noise interference and cross-talk between twisted pair wires.

Means for Solving the Problems

One aspect of the present application is a combination cable for a vehicle, the combination cable having a wire bundle that includes a two-core first twisted pair wire, a two-core second twisted pair wire, a one-core first wire, and a one-core second wire; and a sheath covering the wire bundle. The first twisted pair wire is used to transmit a signal detecting a rotation speed of a wheel of the vehicle. The second twisted pair wire is used to supply driving electric power to a drive source that opens and closes a valve of a dampener in the suspension of the vehicle. The first wire and the second wire are both used to supply driving electric power to a brake caliper in an electric parking brake device of the vehicle. When viewed in cable cross-section, the wire bundle has the first twisted pair wire disposed on one side of a center line that runs from a center of the first wire to a center of the second wire, and has the second twisted pair wire disposed on the other side of the center line, and the first twisted pair wire and the second twisted pair wire are separated from each other.

Effect

In the combination cable for a vehicle described above, when viewed in cable cross-section, the wire bundle has the first twisted pair wire disposed on one side of the center line that runs from the center of the first wire to the center of the second wire, and has the second twisted pair wire disposed on the other side of the center line, and the first twisted pair wire and the second twisted pair wire are separated from each other. Therefore, according to the combination cable for a vehicle described above, a physical distance between the first twisted pair wire and the second twisted pair wire is reliably ensured by the first wire and the second wire, and electromagnetic noise is reduced. Therefore, the combination cable for a vehicle described above can reduce noise interference and cross-talk between the first twisted pair wire and the second twisted pair wire.

DETAILED DESCRIPTION

Figure 1:
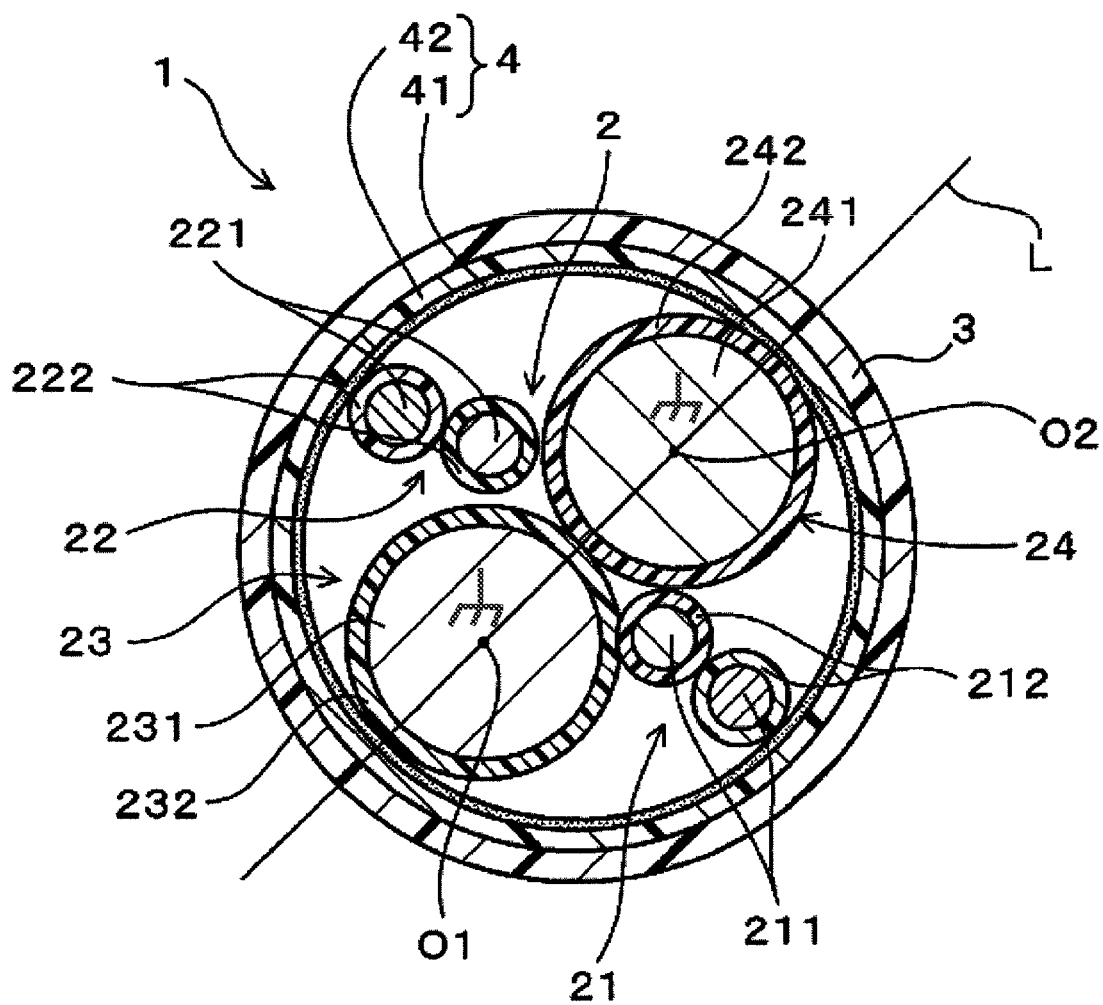
FIG. 1 is an explanatory diagram schematically illustrating a cable cross-section of a combination cable for a vehicle according to Embodiment 1 (and Embodiment 2).

The combination cable for a vehicle described above can be configured such that a first twisted pair wire and a second twisted pair wire are both used while the vehicle is traveling, and a first wire and a second wire are both used after the vehicle stops.

In such a case, a physical distance between the first twisted pair wire and the second twisted pair wire, which are used while the vehicle is traveling, is reliably ensured by the first wire and the second wire, which are not used while the vehicle is traveling, and electromagnetic noise while the vehicle is traveling is reduced. "Use while the vehicle is traveling" includes not only use when the vehicle is in motion but also use while the vehicle is stopped. Furthermore, in such a case, the first wire and the second wire, which are only used after the vehicle stops, are grounded to a chassis or the like while the vehicle is traveling, thereby reducing radiated noise while the vehicle is traveling. Therefore, in such a case, noise interference and cross-talk between the first twisted pair wire and the second twisted pair wire while the vehicle is traveling can be reduced.

In the combination cable for a vehicle described above, the first twisted pair wire is used to transmit a signal detecting a rotation speed of a wheel of the vehicle (hereafter also referred to as "for ABS"), the second twisted pair wire is used to supply driving electric power to a drive source that opens and closes a valve of a dampener in the suspension of the vehicle (hereafter also referred to as "for ADS"), and the first wire and the second wire are both used to supply driving electric power to a brake caliper in an electric parking brake device of the vehicle (hereafter also referred to as "for EPB").

With this configuration, the first twisted pair wire is used while the vehicle is traveling and while the vehicle is stopped. The second twisted pair wire is used while the vehicle is traveling. The first wire and the second wire are both used after the vehicle is stopped. Therefore, with this configuration, due to reasons similar to those noted above, noise interference and cross-talk between the first twisted pair wire and the second twisted pair wire while the vehicle is traveling can be reliably reduced.

In the combination cable for a vehicle described above, a wire bundle can, specifically, be configured to be twisted together in a bundled state.

In such a case, the cable cross-section of the wire bundle is more readily maintained in the cable axis direction. Therefore, in such a case, the beneficial effects noted above can be ensured. In addition, the cable cross-section is more readily made round. In the combination cable for a vehicle described above, the shape of the cable cross-section may be round, for example, or may be elliptical in shape, for example.

In the combination cable for a vehicle described above, the first twisted pair wire and/or the second twisted pair wire may be covered by a shielding conductor. In such a case, together with the beneficial effects noted above, a combination cable for a vehicle can be obtained that is useful in improving noise reduction characteristics. In addition, when the first twisted pair wire is used for ABS and the second twisted pair wire is used for ADS, often a lower current flows through the first twisted pair wire than through the second twisted pair wire, and the first twisted pair wire is favorably covered by at least the shielding conductor. In such a case, the noise reduction characteristics of the combination cable for a vehicle are more readily improved.

Specific examples of the shielding conductor can include a metal foil, braided wires, and the like. The metal foil can be wrapped around an outer circumference of a twisted pair wire, or can be disposed to lie longitudinally alongside the outer circumference of the twisted pair wire.

In the combination cable for a vehicle described above, a twist pitch of the first twisted pair wire and a twist pitch of the second twisted pair wire may be the same, or may be different from each other. In the latter case, the physical distance between the first twisted pair wire and the second twisted pair wire, which have twist pitches that are different from each other, is ensured by the first wire and the second wire. Therefore, cross-talk between the first twisted pair wire and the second twisted pair wire is more readily reduced.

Specifically, the twist pitch of one twisted pair wire can have a pitch length that is one to five times the twist pitch of the other twisted pair wire. More specifically, when the first twisted pair wire is used for ABS and the second twisted pair wire is used for ADS, for example, the twist pitch of the second twisted pair wire can have a pitch length that is at least two times the twist pitch of the first twisted pair wire. Often a lower current flows through the first twisted pair wire than through the second twisted pair wire, and in the above-noted case, by making the twist pitch of the first twisted pair wire smaller, the noise reduction characteristics of the combination cable for a vehicle can be more readily improved.

In the combination cable for a vehicle described above, the first twisted pair wire and the second twisted pair wire can, specifically, be configured by two insulated wires twisted together, the two insulated wires each having an outer circumference of a conductor covered by an insulator. In addition, the first wire and the second wire can, specifically, be configured by an insulated wire having an outer circumference of a conductor covered by an insulator.

Specific examples of a conductor material can include copper, copper alloy, aluminum, aluminum alloy, and the like. Specific examples of an insulator material can include a polyolefin resin such as polyethylene, a polyvinyl chloride resin such as polyvinyl chloride, or the like. From a perspective of cost, resistance to temperatures around 120° C., and so on, polyethylene can be preferably used as the insulator material. The wires included in the wire bundle may have conductors made of the same material, or may have conductors made of different materials, and further may have insulators made of the same material, or may have insulators made of different materials.

In the combination cable for a vehicle described above, specific examples of a sheath material can include a polyurethane resin, a polyvinyl chloride resin, or the like. From a perspective of resistance to external damage, abrasion resistance, and so on, polyurethane can be preferably used as the sheath material.

In the combination cable for a vehicle described above, in addition to each of the wires noted above, the wire bundle can also include one or a plurality of other wires or twisted pair wires. In such a case, from a perspective of ensuring the beneficial effects noted above, the other wires or twisted pair wires are favorably covered by a shielding conductor.

The combination cable for a vehicle described above can include an interposed layer between the wire bundle and the sheath. In such a case, a degree of unevenness in the surface of the wire bundle is ameliorated by the interposed layer. Therefore, unevenness originating from the unevenness of the surface of the wire bundle is less likely to form in the outer surface of the sheath, and a combination cable for a vehicle can be obtained that has a favorable external appearance with little rippling or the like. The interposed layer can be configured by one layer, or by two or more layers.

Examples of a material for the interposed layer can include paper, a polyolefin resin such as polyethylene, talc, or the like. More specifically, when each of the wires in the wire bundle has an insulator of polyethylene, for example, the interposed layer can be configured to include an inner layer configured by paper and an outer layer configured by polyethylene that is disposed on an exterior of the inner layer. In such a case, when the outer layer of the interposed layer and the sheath are formed by two layer extrusion molding, the insulator of each wire in the wire bundle and the outer layer of the interposed layer are less likely to fuse together, and a combination cable for a vehicle can be obtained that has favorable sheath strippability.

In the combination cable for a vehicle described above, the first twisted pair wire and/or the second twisted pair wire may be covered by an interior sheath. Specific examples of a material for the interior sheath can include a polyolefin resin such as polyethylene, a polyvinyl chloride resin, or the like.

The various configurations noted above can be combined as necessary subject to user discretion in order to achieve the various beneficial effects and the like described above, for example.

EMBODIMENTS

Hereafter, combination cables for a vehicle according to embodiments are described with reference to the drawings. Identical reference numerals are used to describe identical components.

Embodiment 1

A combination cable for a vehicle according to Embodiment 1 is described with reference to FIG. 1. As illustrated in FIG. 1, a combination cable 1 for a vehicle according to the present example includes a wire bundle 2 and a sheath 3 covering the wire bundle 2. The wire bundle 2 includes a two-core first twisted pair wire 21, a two-core second twisted pair wire 22, a one-core first wire 23, and a one-core second wire 24.

In the present example, the first twisted pair wire 21 has a configuration in which, specifically, two insulated wires are twisted together in a spiral, the two insulated wires each having an outer circumference of a conductor 211 covered by an insulator 212. The conductor 211 of the first twisted pair wire 21 is formed by a copper alloy and has a conductor cross-sectional area of 0.3 mm$^2$. The insulator 212 is formed by polyethylene. The second twisted pair wire 22 has a configuration in which two insulated wires are twisted together in a spiral, the two insulated wires each having an outer circumference of a conductor 221 covered by an insulator 222. The conductor 221 of the second twisted pair wire 22 is formed by a copper alloy and has a conductor cross-sectional area of 0.5 mm$^2$. The insulator 222 is formed by polyethylene. The twist pitch of the first twisted pair wire 21 and the twist pitch of the second twisted pair wire 22 are set to identical pitch lengths. In addition, the sheath 3 is formed by a polyurethane resin and has a thickness of 1.5 mm.

In addition, in the present example, the first wire 23 is configured by, specifically, an insulated wire having an outer circumference of a conductor 231 covered by an insulator 232. The conductor 231 of the first wire 23 is formed by a copper alloy and has a conductor cross-sectional area of 2.5 mm$^2$. The insulator 232 is formed by polyethylene. The second wire 24 is configured by an insulated wire having an outer circumference of a conductor 241 covered by an insulator 242. The conductor 241 of the second wire 24 is formed by a copper alloy and has a conductor cross-sectional area of 2.5 mm$^2$. The insulator 242 is formed by polyethylene. In the wire bundle 2, each of the wires 21, 22, 23, and 24 are twisted together in a bundled state.

In the present example, the first twisted pair wire 21 is, specifically, used for ABS. The second twisted pair wire 22 is used for ADS. The first wire 23 and the second wire 24 are both used for EPB.

In this example, when viewed in cable cross-section, the wire bundle 2 has the first twisted pair wire 21 disposed on one side of a center line L that runs from a center O1 of the first wire 23 to a center O2 of the second wire 24, and has the second twisted pair wire 22 disposed on the other side of the center line L. In addition, the first twisted pair wire 21 and the second twisted pair wire 22 are separated from each other. In other words, the first twisted pair wire 21 and the second twisted pair wire 22 are not in a state of contact. When the first twisted pair wire 21 and the second twisted pair wire 22 are in the state of being separated from each other, the first wire 23 and the second wire 24 may be in a state of contact with each other, or may not be in a state of contact with each other.

In the present example, the combination cable 1 for a vehicle further includes an interposed layer 4 between the wire bundle 2 and the sheath 3. Specifically, the interposed layer 4 has a two-layer structure that includes an inner layer 41 covering the wire bundle, and an outer layer 42 disposed on an exterior of the inner layer 41. The inner layer 41 is formed by paper, and the outer layer 42 is formed by polyethylene.

Next, the beneficial effects of the combination cable for a vehicle according to the present example are described.

In the combination cable 1 for a vehicle according to the present example, when viewed in cable cross-section, the wire bundle 2 has the first twisted pair wire 21 disposed on one side of the center line L that runs from the center O1 of the first wire 23 to the center O2 of the second wire 24, and has the second twisted pair wire 22 disposed on the other side of the center line L, and the first twisted pair wire 21 and the second twisted pair wire 22 are separated from each other. Therefore, according to the combination cable 1 for a vehicle according to the present example, a physical distance between the first twisted pair wire 21 and the second twisted pair wire 22 is reliably ensured by the first wire 23 and the second wire 24, and electromagnetic noise is reduced. Therefore, the combination cable 1 for a vehicle according to the present example can reduce noise interference and cross-talk between the first twisted pair wire 21 and the second twisted pair wire 22.

Furthermore, in the combination cable 1 for a vehicle according to the present example, the first wire 23 and the second wire 24, which are only used after the vehicle stops, are grounded to a chassis or the like while the vehicle is traveling, thereby reducing radiated noise while the vehicle is traveling. Therefore, the combination cable 1 for a vehicle according to the present example is useful for reducing noise interference and cross-talk between the first twisted pair wire 21 and the second twisted pair wire 22 while the vehicle is traveling.

Embodiment 2

A combination cable for a vehicle according to Embodiment 2 is described with reference to FIG. 1. In the combination cable 1 for a vehicle according to the present example, the twist pitch of the second twisted pair wire 22, which is used for ADS, is set to a pitch length that is two times the twist pitch of the first twisted pair wire 21, which is used for ABS. Other configurations are similar to Embodiment 1.

Often a lower current flows through the first twisted pair wire 21 than through the second twisted pair wire 22, and in the combination cable 1 for a vehicle according to the present example, the twist pitch of the first twisted pair wire 21 is set to a pitch length that is smaller than the twist pitch of the second twisted pair wire 22. Therefore, the combination cable 1 for a vehicle is useful in improving noise reduction characteristics. Other beneficial effects are similar to Embodiment 1.

Embodiment 3

Figure 2:
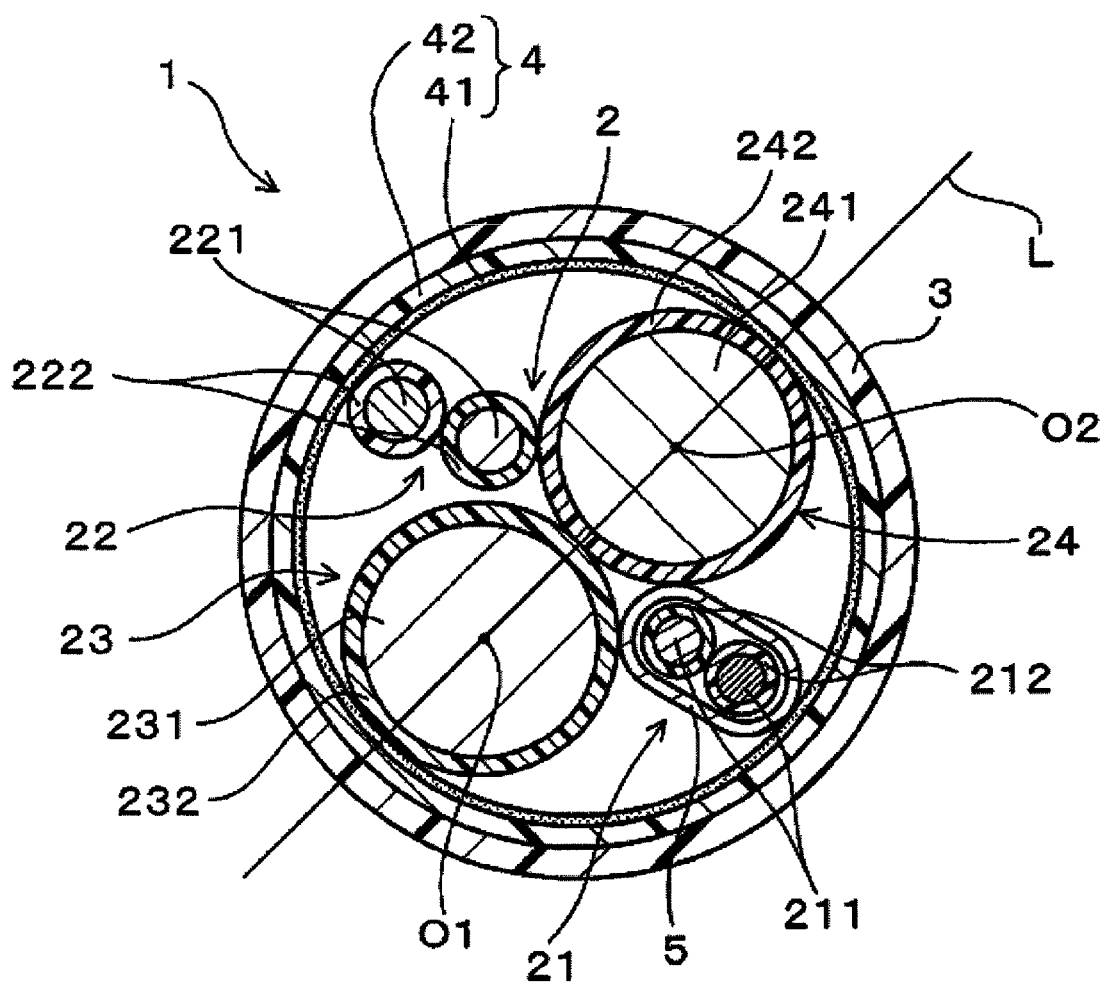
FIG. 2 is an explanatory diagram schematically illustrating a cable cross-section of a combination cable for a vehicle according to Embodiment 3.

A combination cable for a vehicle according to Embodiment 3 is described with reference to FIG. 2. In the combination cable 1 for a vehicle according to the present example, the first twisted pair wire 21, which is used for ABS, is covered by a shielding conductor 5. Specifically, the shielding conductor 5 is formed by transverse winding of an aluminum alloy foil (metal foil). Other configurations are similar to Embodiment 1.

Often a lower current flows through the first twisted pair wire 21 than through the second twisted pair wire 22, and in the combination cable 1 for a vehicle according to the present example, the first twisted pair wire 21 is covered by the shielding conductor 5. Therefore, the combination cable 1 for a vehicle is useful in improving noise reduction characteristics. Other beneficial effects are similar to Embodiment 1.

Embodiment 4

Figure 3:
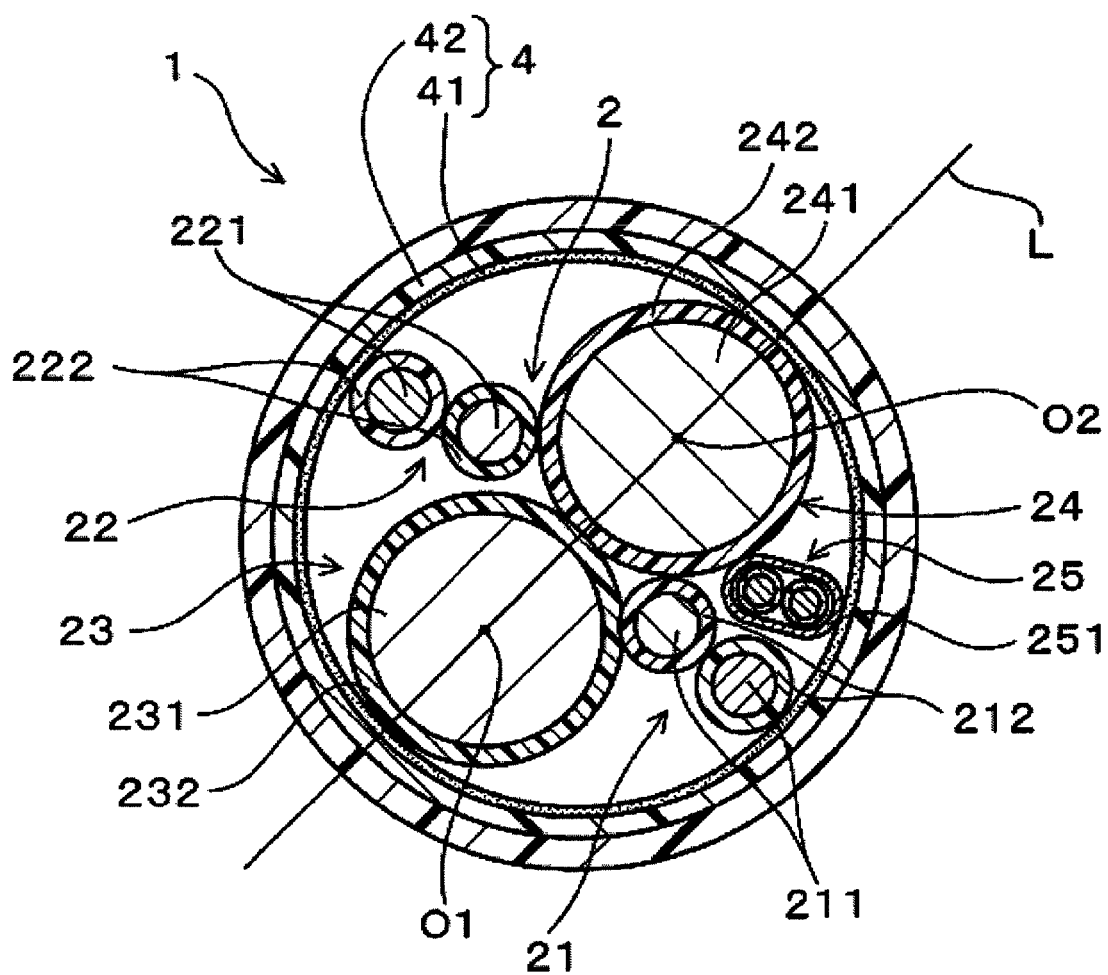
FIG. 3 is an explanatory diagram schematically illustrating a cable cross-section of a combination cable for a vehicle according to Embodiment 4.

A combination cable for a vehicle according to Embodiment 4 is described with reference to FIG. 3. The combination cable 1 for a vehicle according to the present example is an example where the wire bundle includes another two-core twisted pair wire 25 in addition to the wires 21, 22, 23, and 24 noted above. In the present example, the twisted pair wire 25 is covered by a shielding conductor 251. Specifically, the shielding conductor 251 is formed by transverse winding of an aluminum alloy foil (metal foil).

Similar beneficial effects to Embodiment 1 can be achieved with the present example, as well.

In the foregoing description, embodiments of the present application are described in detail; however, the present application is not limited to the embodiments described above, and various modifications can be made without departing from the scope of the present application.

The invention claimed is:

1. A combination cable for a vehicle, the combination cable comprising:
    a wire bundle;
    a sheath covering the wire bundle; and
    an interposed layer disposed between the sheath and the wire bundle,
    wherein the wire bundle comprises a two-core first twisted pair wire, a two-core second twisted pair wire, a one-core first wire, and a one-core second wire,
    the first twisted pair wire, the second twisted pair wire, the first wire, and the second wire are twisted together in a bundled state and are arranged in a circumferential direction of the sheath in an order of the first wire, the first twisted pair wire, the second wire, and the second twisted pair wire,
    each of the first wire and the second wire includes a single insulated wire,
    each of the first twisted pair wire and the second twisted pair wire includes two insulated wires, which are twisted together,
    each of the single insulated wire and the two insulated wires includes a conductor, and a single layer insulator covering the conductor,
    a sum of diameters of the two conductors provided in the first twisted pair wire is smaller than a diameter of the conductor provided in the first wire and is smaller than a diameter of the conductor provided in the second wire,
    a sum of diameters of the two conductors provided in the second twisted pair wire is smaller than the diameter of the conductor provided in the first wire and is smaller than the diameter of the conductor provided in the second wire,
    a material of the conductor provided in the first wire and a material of the conductor provided in the second wire are different from a material of the two conductors provided in the first twisted pair wire and a material of the two conductors provided in the second twisted pair wire,
    at least in a portion of the first twisted pair wire and the second twisted pair wire in a longitudinal direction, the first twisted pair wire and the second twisted pair wire are separated from each other,
    wherein the combination cable further comprises:
        a cross-sectional surface satisfying a first condition, a second condition, a third condition, and a fourth condition, wherein
        in the first condition, when a straight line connecting centers of the two insulated wires provided in the first twisted pair wire is a first straight line and a straight line connecting centers of the two insulated wires provided in the second twisted pair wire is a second straight line, both the first straight line and the second straight line extend in a direction intersecting with a center line connecting a center of the first wire and a center of the second wire,
        in the second condition, when an angle formed by the first straight line and the center line is a first angle, and an angle formed by the second straight line and the center line is a second angle, the first angle and the second angle are different,
        in the third condition, of the first angle and the second angle, one of the first and second angles is closer to being a right angle compared to the other one of the first and second angles, and
        in the fourth condition, when a straight line that is perpendicular to the center line and that passes through a middle between the center of the first wire and the center of the second wire is a third straight line, the third straight line intersects with each of the first twisted pair wire and the second twisted pair wire.

2. The combination cable for a vehicle according to claim 1, wherein a thickness of the sheath is thicker than each thickness of the insulators provided in the first wire, the second wire, the first twisted pair wire, and the second twisted pair wire, respectively.

3. The combination cable for a vehicle according to claim 1, wherein the first wire and the second wire are disposed to reduce noise interference between the first twisted pair wire and the second twisted pair wire.

4. The combination cable for a vehicle according to claim 2, wherein the first wire and the second wire are disposed to reduce noise interference between the first twisted pair wire and the second twisted pair wire.

5. The combination cable for a vehicle according to claim 1, wherein a pitch length of a twist pitch of the first twisted pair wire and a pitch length of a twist pitch of the second twisted pair wire are different.

6. The combination cable for a vehicle according to claim 1, wherein the interposed layer includes a material that is a polyolefin resin.

* * * * *